United States Patent
Chutorash

[11] Patent Number: 6,020,654
[45] Date of Patent: Feb. 1, 2000

[54] AUTO PC WALLET PC FACEPLATE

[75] Inventor: Richard J. Chutorash, Rochester Hills, Mich.

[73] Assignee: Lear Automotive Dearborn, Inc., Dearborn, Mich.

[21] Appl. No.: 09/048,155

[22] Filed: Mar. 25, 1998

[51] Int. Cl.[7] ................................. G09G 5/00; B60L 1/00
[52] U.S. Cl. .................. 307/10.1; 340/461; 340/825.72; 345/173; 701/36
[58] Field of Search ..................................... 307/9.1–10.6; 701/1, 29, 33, 35, 36, 45, 49; 439/34; 340/425.5, 438, 461, 539, 825.69, 825.72; 345/173–178

[56] References Cited

U.S. PATENT DOCUMENTS

| | | | |
|---|---|---|---|
| 5,521,443 | 5/1996 | Imura et al. ............................ | 307/10.2 |
| 5,638,060 | 6/1997 | Kataoka et al. ........................ | 340/438 |
| 5,808,373 | 9/1998 | Hamanishi et al. .................... | 307/10.1 |
| 5,808,374 | 9/1998 | Miller et al. ............................ | 307/10.1 |
| 5,889,337 | 3/1999 | Ito et al. ................................. | 307/10.1 |

*Primary Examiner*—Richard T. Elms
*Attorney, Agent, or Firm*—Brooks & Kushman PC

[57] ABSTRACT

The invention relates to a device to serve as an interface between a vehicle computer and a user. The interface comprises a docking site mounted within the vehicle and connected to the computer through a high-speed serial communication cable. The docking site receives an input device and establishes an electrical connection between the input device and the vehicle computer. The input device may be any of a variety of palm held computers. The input device permits a user to access the vehicle computer which in turn controls a variety of vehicle components.

16 Claims, 2 Drawing Sheets

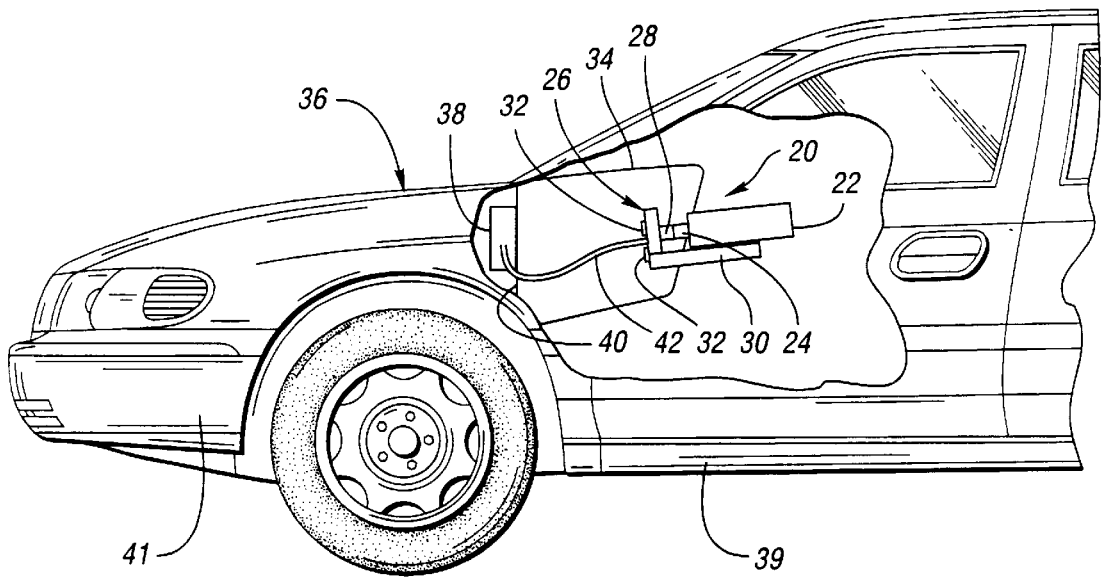
*Fig. 1*
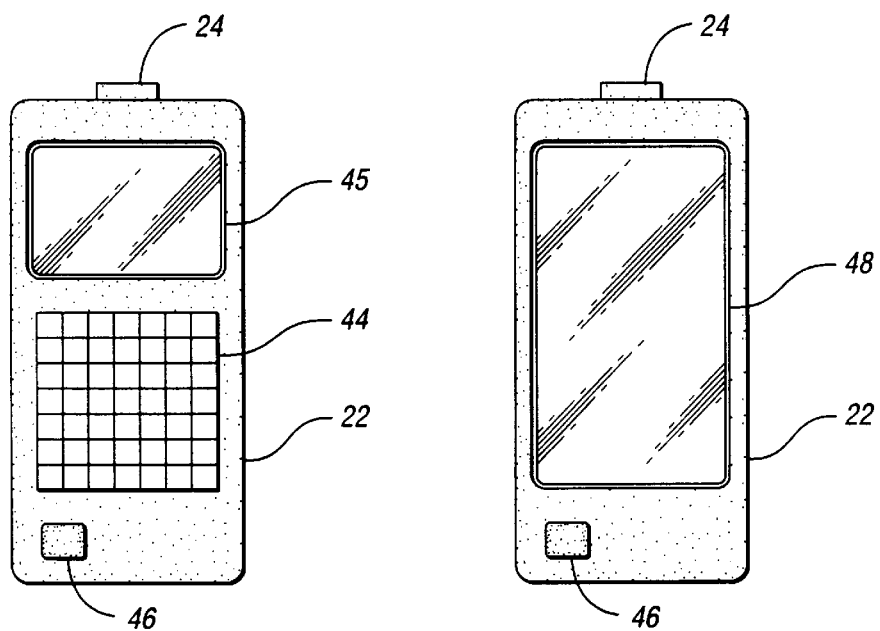
*Fig. 2*  *Fig. 3*

AUTO PC WALLET PC FACEPLATE

BACKGROUND OF THE INVENTION

This invention relates generally to an interface and, more particularly, to an interface for communicating with a computer mounted in a vehicle.

Current vehicles often include a computer mounted somewhere in the vehicle. The computer may be used to perform diagnostic analysis of various vehicle components. A computer is also often used to control the settings of various vehicle components such as vehicle climate control systems, the position of mirrors, seat positions, audio functions, and vehicle handling characteristics.

In many current vehicles, the radio faceplate serves as the interface between a user and the computer. This system creates several disadvantages. A first disadvantage is that each car model generally requires a different customized radio faceplate to provide coordination with the vehicle interior. Second, current radio faceplates generally limit the ability of a user to communicate with the computer because of design and space constraints. This becomes a particular problem as designers continue to add more functions to the vehicle computer such as vehicle security systems, cellular phone communications, and additional vehicle handling characteristics.

Thus, it is desirable to provide a standardized interface that can universally replace current radio faceplates. It is also desirable to provide an interface that provides an enhanced ability to communicate with a vehicle computer. It is also desirable to provide an interface that is removable by a user.

SUMMARY OF THE INVENTION

In general terms, this invention provides a universal interface that can be used in a wide variety of vehicles to access a vehicle computer.

The interface comprises an input device and a docking site mounted within the vehicle. The input device includes a display and a first electrical connector. The docking site includes a second electrical connector and a platform. The second electrical connector receives the first electrical connector and the platform supports the input device. A communication cable connects the second electrical connector to the computer. The computer is accessible through the input device.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a partial cross-sectional side view of an interface designed according to the present invention mounted within a vehicle.

FIG. 2 is a top plan view of an input device having a keyboard designed according to this invention.

FIG. 3 is a top plan view of an input device having a touch sensitive screen designed according to this invention.

DETAILED DESCRIPTION OF THE PREFERRED EMBODIMENT

Figure 4:
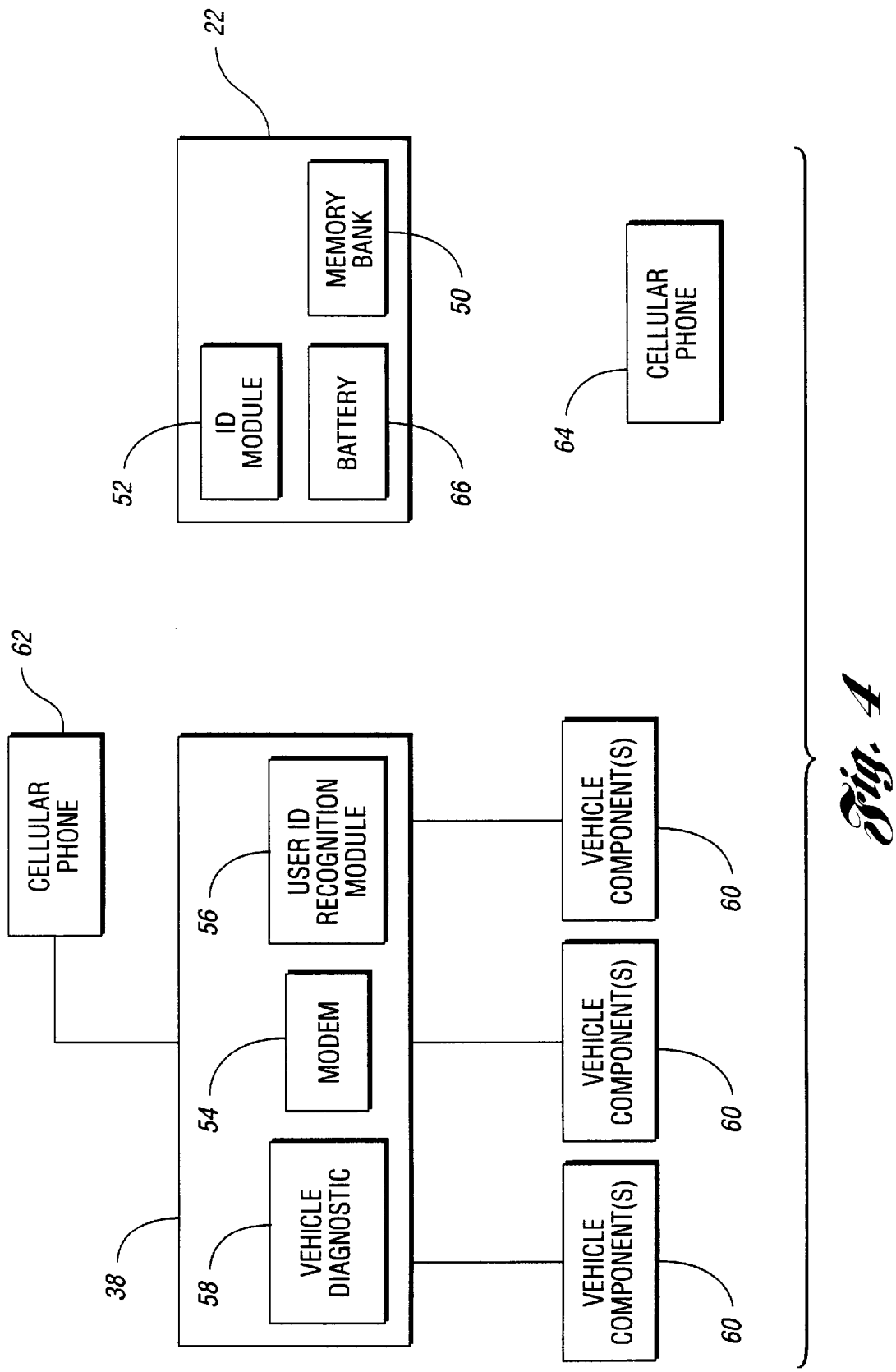
FIG. 4 is a schematic of an interface designed according to this invention.

An interface is generally indicated at 20 in FIG. 1. The interface 20 includes an input device 22 having a first electrical connector 24. A docking site 26 includes a second electrical connector 28 that receives the first electrical connector 24. A platform 30 of the docking site 26 supports the input device 22. A plurality of fasteners 32 secure the docking site 26 within a dashboard 34 of a vehicle 36. A computer 38 is secured to a surface 40 of the vehicle 36. The surface 40 may be the firewall typically found between a passenger compartment 39 and an engine compartment 41. As will be understood by one of ordinary skill in the art, the computer 38 could also be mounted elsewhere within the vehicle 36. A communication cable 42 connects the second electrical connector 28 to the computer 38. Preferably, the first electrical connector 24, second electrical connector 28, and communication cable 42 form a high speed serial connection. As will be understood by one of ordinary skill in the art, the connection between the first electrical connector 24 and the computer 38 may be of a type other than a high speed serial connection. As shown in FIG. 1, the input device 22 and docking site 26 are located within the dashboard 34. Alternatively, the docking site 26 and the input device 22 could be mounted in another site within the vehicle 36 such as in a console or armrest (not shown).

FIG. 2 is a top plan view of one embodiment of the input device 22. In this embodiment, the input device 22 includes a keyboard 44, a display 45, and a microphone 46. The keyboard 44 is utilized for communication between the input device 22 and the computer 38. The display 45 displays data sent to and received from the computer 38. The microphone 46 is optional and provides a means both for recording audible input and for controlling the computer 38 through audible input.

FIG. 3 is a top plan view of an alternative embodiment of the input device 22 having a touch sensitive screen 48. The touch sensitive screen 48 serves both as a display for displaying data sent to and received from the computer 38 and as a means for entering data to be sent to the computer 38. The touch sensitive screen 48 is of an ordinary design as will be understood by one having ordinary skill in the art.

FIG. 4 is a schematic of an interface design according to this invention. Preferably, the input device 22 includes a computer memory bank 50 for storing data received from the computer 38 or the input device 22. The input device 22 further includes a user identification module 52. Preferably, the user identification module 52 is implemented through software and allows a user to assign user preferences to the input device 22. Preferably, the computer 38 further includes a modem 54, a user identification recognition module 56 and a vehicle diagnostics module 58. Most preferably, both the user identification recognition module 56 and the vehicle diagnostics module 58 are implemented through software. A plurality of vehicle components 60 are connected to the computer 38 and the computer 38 controls various settings of the vehicle components 60. A first communication device 62 is also connected to the computer 38. Most preferably, the first communication device 62 is integrated into the computer 38 and comprises a cellular phone. A second communication device 64 is not connected to the computer 38 or the input device 22 and is located remote from the vehicle 36. The second communication device 64 is also preferably a cellular phone. The second communication device 64 is used by a remote user to communicate with the first communication device 62. The input device 22 also includes a battery 66. Most preferably the battery 66 is of a rechargeable type and the computer 38 is adopted to recharge the battery 66 when the first electrical connector 24 is received in the second electrical connector 28.

Most preferably the input device 22 is a personal data administrator commonly known as a palm held computer.

Such an input device 22 would be removable from the docking site 26 and fully transportable by a user. Such an input device 22 would also include data typically found in such personal data administrators like address books, appointment calendars, and to do lists. Preferably, the computer 38 further includes functions implemented through software such as a vehicle security system, e-mail capability through the first communication device 62 and the modem 54, and voice recognition software for permitting audible input from the microphone 46 to control the functions of the computer 38. The vehicle components 60 which may be connected to the computer 38 would include such things as vehicle seats, side view and rear view mirrors, the vehicle audio system, the vehicle climate control system, and vehicle handling control components. Vehicle handling control components might include such things as shocks, all wheel drive systems, and vehicle transmission systems. These vehicle components 60 include a variety of settings which are be adjustable through the computer 38.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. An interface for communicating with a computer mounted in a vehicle, said interface comprising:

a personal data administrator having a first electrical connector and a display;

a docking site having a second electrical connector adapted to receive said first electrical connector, said docking site mounted in a vehicle and supporting said personal data administrator within said vehicle;

a communication cable, said communication cable connecting said second electrical connector to said computer; and said computer accessible through said personal data administrator and said said personal data administrator being removable and transportable by a user.

2. An interface as recited in claim 1 wherein said communication cable comprises a high speed serial cable and said first and said second electrical connectors comprise high speed serial connections.

3. An interface as recited in claim 1 wherein said display comprises a touch sensitive screen, said touch sensitive screen permitting a user to access said computer.

4. An interface as recited in claim 1 wherein said personal data administrator includes a microphone and said computer responds to input from said microphone, said microphone permitting a user to access said computer through audible input.

5. An interface as recited in claim 1 wherein said personal data administrator includes a computer memory bank, said computer memory bank accessible by said computer and said personal data administrator.

6. An interface as recited in claim 1 wherein said personal data administrator further includes a keyboard, said keyboard permitting a user to access said computer.

7. An interface as recited in claim 1 wherein said computer is connected to a plurality of vehicle components, said personal data administrator allowing a user to access and modify a plurality of settings of said plurality of vehicle components.

8. An interface as recited in claim 7 wherein said computer further includes a user identification recognition module and said personal data administrator includes a user identification module;

said identification module accessible to said recognition module; and said computer modifying at least one of said plurality of settings of said plurality of vehicle components based on said identification module.

9. An interface as recited in claim 1 wherein said docking site further includes a platform, said platform supporting said personal data administrator within said vehicle.

10. An interface as recited in claim 1 further comprising a first communication device, said first communication device connected to said computer and accessible through said personal data administrator, said first communication device transmitting signals to and receiving signals from a second communication device, said second communication device not connected to said computer.

11. An interface as recited in claim 10 wherein said first communication device comprises a cellular phone.

12. An interface as recited in claim 1 wherein said personal data administrator includes at least one battery and said at least one battery is recharged while said first electrical connector is received in said second electrical connector.

13. An interface as recited in claim 1 wherein said computer includes a vehicle diagnostics module;

said diagnostics module connected to a plurality of vehicle components through said computer; and said diagnostics module accessible through said personal data administrator.

14. An interface for communicating with a computer mounted in a vehicle, said interface comprising:

a personal data administrator including a display comprising a touch sensitive screen and a first electrical connector;

a docking site having a second electrical connector adapted to receive said first electrical connector, said docking site mounted in a vehicle and supporting said personal data administrator within said vehicle, said personal data administrator being removable from the docking site and being transportable by a user;

a communication cable, said communication cable connecting said second electrical connector to said computer; and said computer accessible to said personal data administrator through said touch sensitive screen.

15. An interface as recited in claim 14 wherein said personal data administrator includes a computer memory bank;

said computer memory bank receiving data from said computer; and said computer memory bank accessible by said personal data administrator when said personal data administrator is removed from said docking site.

16. An interface for communicating with a computer mounted in a vehicle, said interface comprising:

an input device having a first electrical connector and a display;

a docking site having a second electrical connector adapted to receive said first electrical connector, said docking site mounted in a vehicle and supporting said input device within said vehicle;

a communication cable, said communication cable connecting said second electrical connector to said computer; and said computer accessible through said input device and said input device being removable wherein said computer is connected to a plurality of vehicle components, said input device allowing a user to access and modify a plurality of settings of said plurality of vehicle components wherein said computer further includes a user identification recognition module and said input device includes a user identification module; said identification module accessible to said recognition module; and said computer modifying at least one of said plurality of settings of said plurality of vehicle components based on said identification module.

* * * * *